United States Patent
Li et al.

(10) Patent No.: US 8,565,688 B2
(45) Date of Patent: Oct. 22, 2013

(54) METHOD OF REDUCING FEEDBACK LOAD AND FEEDBACK OVERHEAD IN A MULTI-CELL COOPERATIVE NETWORK AND RELATED COMMUNICATION DEVICE

(75) Inventors: Jin-Hao Li, Taipei (TW); Hsuan-Jung Su, Taipei (TW); Yu-Chih Jen, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

(21) Appl. No.: 13/351,246

(22) Filed: Jan. 17, 2012

(65) Prior Publication Data
US 2013/0017825 A1    Jan. 17, 2013

Related U.S. Application Data

(60) Provisional application No. 61/433,278, filed on Jan. 17, 2011.

(51) Int. Cl.
*H04B 17/00*    (2006.01)

(52) U.S. Cl.
USPC ............................................ 455/67.11

(58) Field of Classification Search
USPC ........ 455/67.11, 522, 403, 422.1, 507, 562.1, 455/450, 101, 277.1; 375/316, 227, 267; 370/252, 315, 334, 311, 329
See application file for complete search history.

(56) References Cited

U.S. PATENT DOCUMENTS

| | | | |
|---|---|---|---|
| 2004/0125773 A1* | 7/2004 | Wilson et al. | 370/337 |
| 2007/0243829 A1* | 10/2007 | Nagato et al. | 455/67.11 |
| 2010/0322351 A1* | 12/2010 | Tang et al. | 375/316 |

OTHER PUBLICATIONS

A. Papadogiannis, H.J. Bang, D. Gesbert, E. Hardouin "Efficient Selective Feedback Design for Multicell Cooperative Networks" IEEE Transactions on Vehicular Technology, Jan. 2011.
A. Papadogiannis "Downlink Overhead Reduction for Multi-cell Cooperative Processing enabled Wireless Networks" in Proc. IEEE PIMRC, 2008.
R. Bhagavatula, R.W. Heath Jr. "Adaptive Limited Feedback for Sum-Rate Maximizing Beamforming in Cooperative Multicell Systems," available on ArxiV at http://arxiv.org/abs/0912.0962, date: Dec. 2009.
R. Bhagavatula, R.W. Heath Jr., B. Rao "Limited Feedback with joint CSI quantization for multicell cooperative generalized eigenvector beamforming", in Proc. IEEE ICASSP, 2010.
X. Hou, and C.Yang "Impact of Channel Asymmetry on Base Station Cooperative Transmission with Limited Feedback" available on ArxiV at http://arxiv.org/abs/1004.4826v1, date: 2010.
R. Bhagavatula, R.W. Heath Jr. "Adaptive Limited Feedback for Sum-Rate Maximizing Beamforming in Cooperative Multicell Systems," IEEE Transactions on Signal Processing, Feb. 2011.
3GPP TR 36.814 V9.0.0 (Mar. 2010) Technical Report 3rd Generation Partnership Project; Technical Specification Group Radio Access Network; Evolved Universal Terrestrial Radio Access (E-UTRA); Further advancements for E-UTRA physical layer aspects (Release 9).

* cited by examiner

*Primary Examiner* — Kiet Doan
(74) *Attorney, Agent, or Firm* — Winston Hsu; Scott Margo (57) ABSTRACT

A method of reducing an amount of channel information fed back by a mobile device in a wireless communication system to a plurality of transmission points of the wireless communication system is disclosed. the method comprises measuring signal quality between the mobile device and the plurality of transmission points; determining a set of the plurality of transmission points, if the signal quality is in one of a plurality of quality regions; and feeding back the channel information to the set of the plurality of transmission points, wherein the channel information is related to a plurality of channels between the mobile device and the set of the plurality of transmission points.

17 Claims, 5 Drawing Sheets

METHOD OF REDUCING FEEDBACK LOAD AND FEEDBACK OVERHEAD IN A MULTI-CELL COOPERATIVE NETWORK AND RELATED COMMUNICATION DEVICE

CROSS REFERENCE TO RELATED APPLICATIONS

This application claims the benefit of U.S. Provisional Application No. 61/433,278, filed on Jan. 17, 2011 and entitled "Method and Apparatus for Feedback Load and Overhead Reduction in Multi-cell Cooperative Networks", the contents of which are incorporated herein in their entirety.

BACKGROUND OF THE INVENTION

1. Field of the Invention

The present invention relates to a method used in a wireless communication system and related communication device, and more particularly, to a method of reducing feedback load and feedback overhead in a multi-cell cooperative network and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy requirement of IMT-Advanced on capacity and cell-edge throughput. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved NodeBs (eNBs) which is a transmission point for communicating with multiple UEs, and communicates with a core network including a mobility management entity (MME), a serving gateway, etc., for Non Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multi-point transmission/reception (CoMP), UL multiple-input multiple-output (MIMO), etc. For a UE and an eNB to communicate with each other in the LTE-A system, the UE and the eNB must be compatible with the standards developed for the LTE-A system, such as the 3GPP Rel-10 standard or later versions.

When a UE and multiple transmission points (e.g. an eNB, a relay node or a remote antenna of a transmission point) are configured in the CoMP scheme, the UE may communicate with the transmission points simultaneously, i.e., access a service via all or part of the transmission points. These transmission points form a CoMP cooperating set. More specifically, an eNB is one of transmission points, and it may manage multiple transmission points (e.g. via remote radio head (RRH)). That is, Cell IDs of different transmission points may be different (e.g. when being managed by different eNBs), or may be the same (e.g. when being managed by the same eNB). Thus, signals transmitted between the UE and the transmission points can be easily recovered due to better quality of the received signals. In detail, when the transmission points are involved in the CoMP scheme, one of the transmission points is a serving point (e.g. serving cell). In general, link quality between the serving point and the UE is better than those between other transmission points and the UE. Control information required for the CoMP scheme is usually transmitted by the UE to the serving point first. Then, the serving point exchanges the control information with other transmission points such that the CoMP scheme can operate regularly. Further, the CoMP scheme can be classified into two main categories: Joint Processing (JP) and Coordinated Scheduling/Beamforming (CS/CB). When the JP is configured (i.e. enabled), data for the UE is available at and transmitted from part or all of the transmission points. When the CS/CB is configured, the data for the UE is only available at and transmitted from one of the transmission points of the CoMP cooperating set. The JP can be further divided into two categories: joint transmission and dynamic point selection. When the joint transmission is configured, the data for the UE can be transmitted from multiple transmission points (e.g. coherently or noncoherently) to the UE to improve received signal-to-interference-plus-noise ratio (SINR). When the dynamic point selection is configured, the data for the UE is transmitted from only one of the transmission points (e.g. according to the decisions made in coordination among the transmission points) to the UE to improve signal quality and/or reduce the interferences. On other hand, when the CS/CB is configured, the data for the UE is only transmitted from one of transmission points of the CoMP cooperating set to the UE, while other transmission points may stop transmissions or adjust beamforming to mitigate the interferences.

However, channel information between the transmission points and the UE should be available at the transmission points, before the CoMP scheme can be operated efficiently and properly. Accordingly, the UE should feed back the channel information to the transmission points periodically or aperiodically. Preferably, the channel information is related to channel condition between the UE and the transmission points. However, an amount of the channel information increases with a size of the CoMP cooperating set (i.e., an amount of the transmission points). That is, when the size of the CoMP cooperating set increases, an amount of radio resources required by the UE to feed back the channel information also increases. Not only feedback load of the mobile device is increased, but a large amount of feedback overhead is caused on an uplink between the mobile device and the transmission points and in backhauls between the transmission points. Thus, the CoMP scheme cannot be operated regularly when uplink feedback resource is limited. Therefore, how to solve the problem of reduction of the feedback load and the feedback overhead is a topic to be discussed and addressed.

SUMMARY OF THE INVENTION

The present invention therefore provides a method and related communication device for reducing feedback load and feedback overhead in a multi-cell cooperative network to solve the above-mentioned problems.

A method of reducing an amount of channel information fed back by a mobile device in a wireless communication system to a plurality of transmission points of the wireless communication system is disclosed. the method comprises measuring signal quality between the mobile device and the plurality of transmission points; determining a set of the plurality of transmission points, if the signal quality is in one of a plurality of quality regions; and feeding back the channel information to the set of the plurality of transmission points, wherein the channel information is related to a plurality of channels between the mobile device and the set of the plurality of transmission points.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
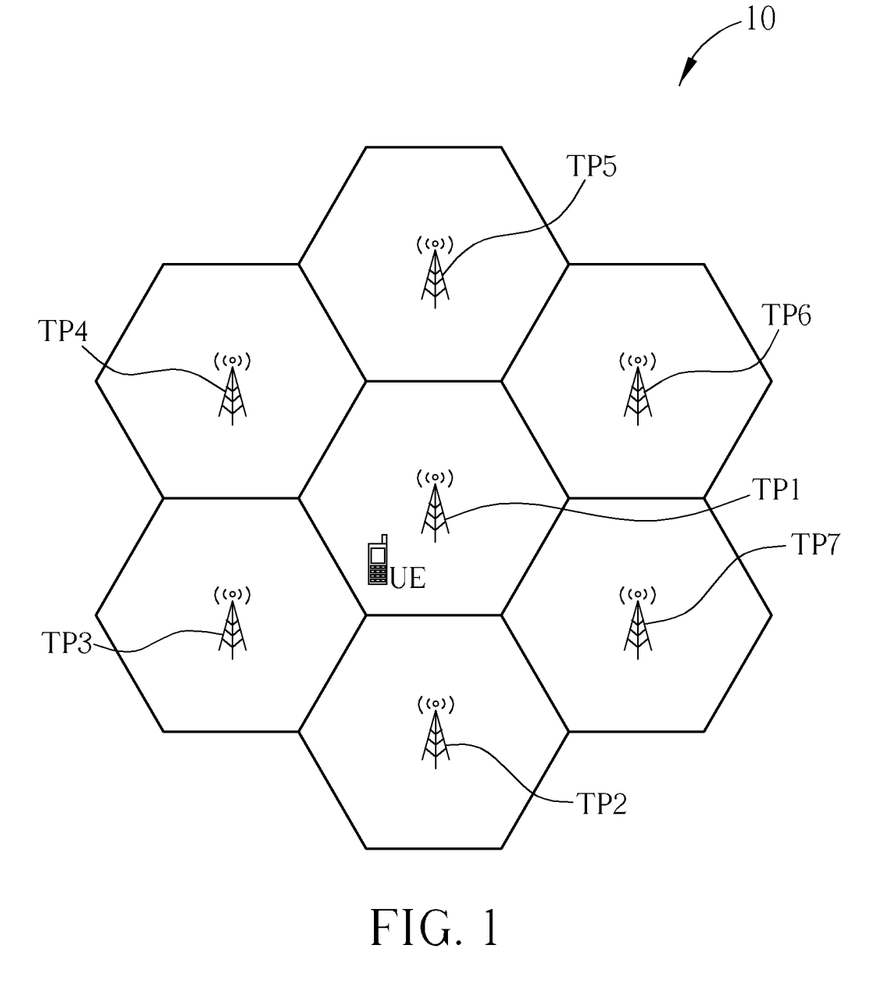
FIG. 1 is a schematic diagram of a wireless communication system according to an embodiment of the present invention.

Please refer to FIG. 1, which is a schematic diagram of a wireless communication system 10 according to an embodiment of the present invention. The wireless communication system 10 is briefly composed of a UE and 7 transmission points TP1-TP7, wherein each of the transmission points TP1-TP7 can perform data transmissions and receptions with the UE. The wireless communication system 10 may be a wideband code division multiple access (WCDMA) system such as a universal mobile telecommunications system (UMTS). Alternatively, the wireless communication system 10 may be an orthogonal frequency division multiplexing (OFDM) system and/or an orthogonal frequency division multiple access (OFDMA) system, such as a long term evolution (LTE) system, a LTE-Advanced (LTE-A) system or a newly developed standard.

Please note that, the UE and the transmission points TP1-TP7 are simply utilized for illustrating a structure of the wireless communication system 10. Practically, the transmission points TP1-TP7 can be referred as NodeBs (NBs) in a universal terrestrial radio access network (UTRAN) of the UMTS or evolved NodeBs (eNBs) in an evolved UTRAN (E-UTRAN) or relay nodes of the LTE system or the LTE-A system, and are not limited herein. The UE can be mobile devices such as mobile phones, laptops, tablet computers, electronic books, and portable computer systems. Besides, a transmission point and the UE can be seen as a transmitter or a receiver according to transmission direction, e.g., for an uplink (UL), the UE is the transmitter and the transmission point is the receiver, and for a downlink (DL), the transmission point is the transmitter and the UE is the receiver.

Besides, the wireless communication system 10 can be seen as a multi-point cooperative network comprised of multiple transmission points. That is, the UE may transmit signals to a set of the transmission points TP1-TP7, and the UE may receive the signals transmitted by a set of the transmission points TP1-TP7. As a result, signal quality of the received signals is improved. For example, when the wireless communication system 10 is referred to the LTE-A system, it means that the wireless communication system 10 supports coordinated multi-point transmission/reception (CoMP) scheme. The CoMP scheme can be configured as Joint Processing (JP) (e.g. joint transmission or dynamic point selection) and Coordinated Scheduling/Beamforming (CS/CB), and is not limited. Further, without loss of generality, the transmission points TP1-TP7 form a CoMP cooperating set for the UE (i.e., the transmission points TP1-TP7 are cooperating points), wherein the transmission point TP1 can be seen as a serving point (i.e., serving cell) for the UE.

Figure 2:
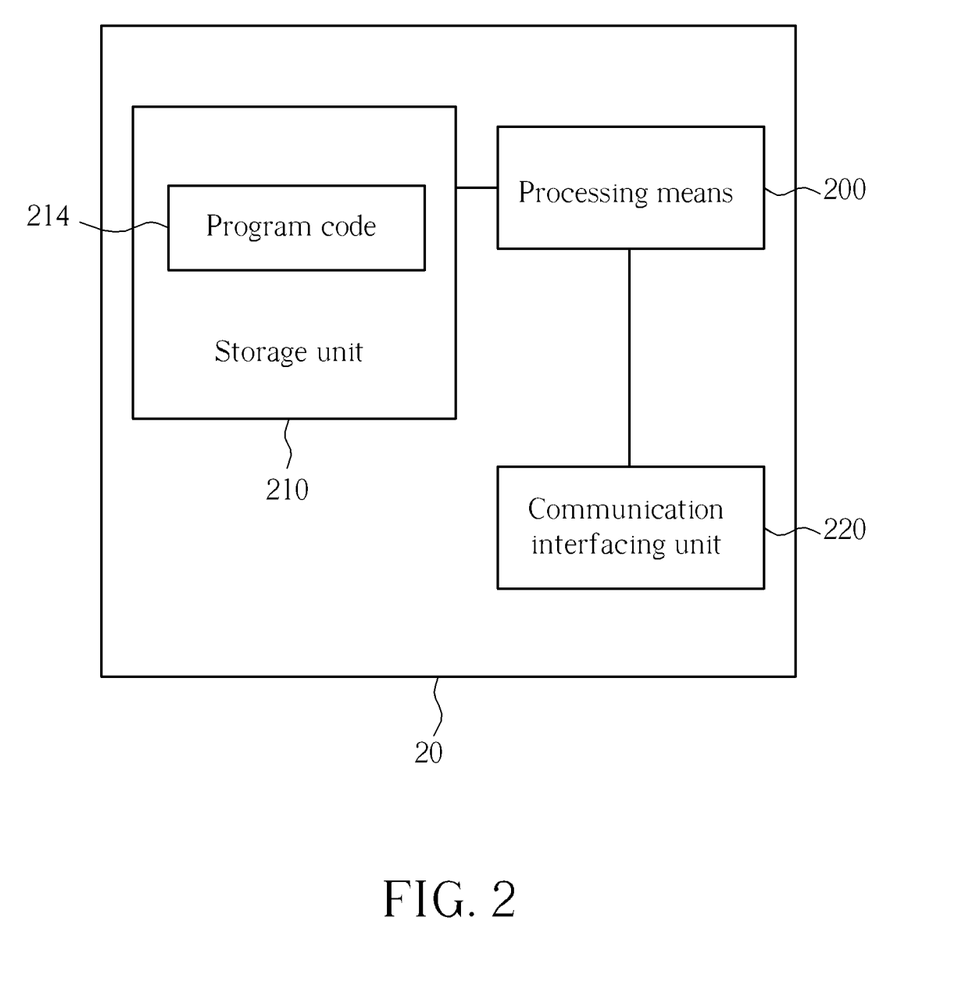
FIG. 2 is a schematic diagram of a communication device according to an embodiment of the present invention.

Please refer to FIG. 2, which is a schematic diagram of a communication device 20 according to an embodiment of the present invention. The communication device 20 can be the UE or a transmission point shown in FIG. 1, but is not limited herein. The communication device 20 may include a processing means 200 such as a microprocessor or an Application Specific Integrated Circuit (ASIC), a storage unit 210 and a communication interfacing unit 220. The storage unit 210 may be any data storage device that can store a program code 214, accessed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a radio transceiver, and can transmit and receive wireless signals according to processing results of the processing means 200.

Figure 3:
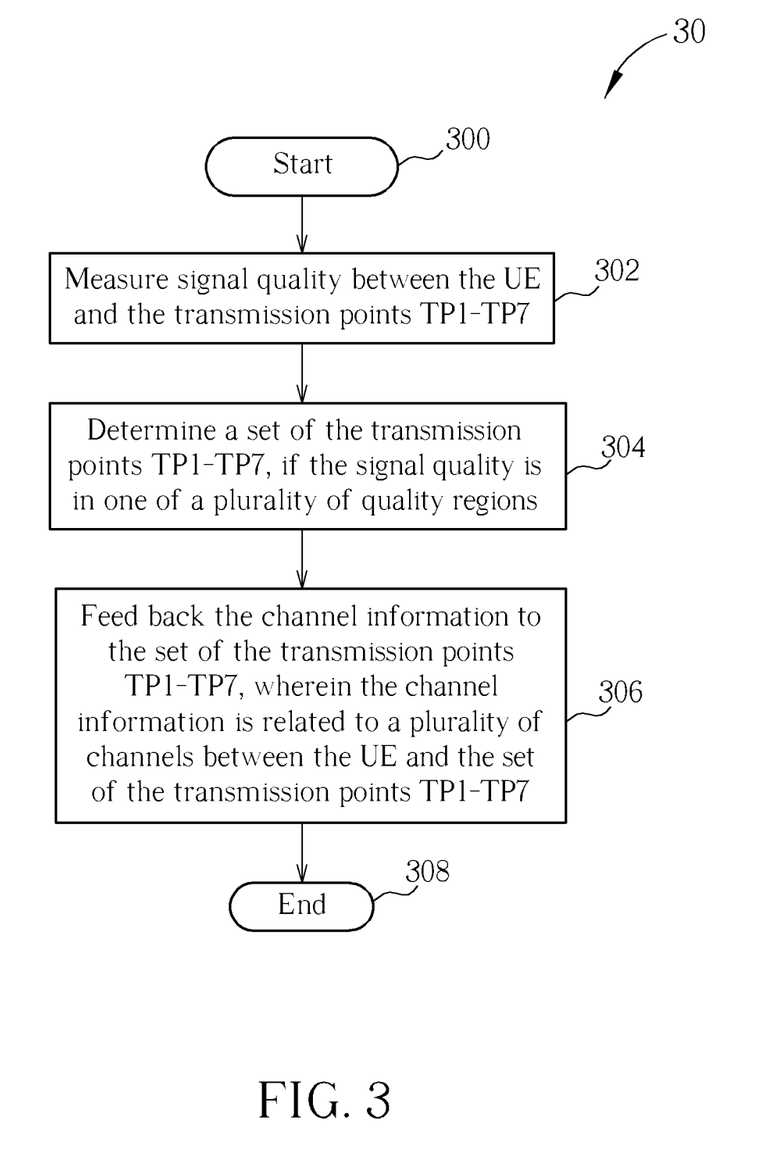
FIG. 3 is a flowchart of a process according to an embodiment of the present invention.

Please refer to FIG. 3, which is a flowchart of a process 30 according to an embodiment of the present invention. The process 30 is utilized in the UE and/or the transmission pointy TP1 shown in FIG. 1, for reducing feedback load and feedback overhead in the wireless communication system 10. The process 30 may be compiled into the program code 214 and includes the following steps:

Step 300: Start.

Step 302: Measure signal quality between the UE and the transmission points TP1-TP7.

Step 304: Determine a set of the transmission points TP1-TP7, if the signal quality is in one of a plurality of quality regions.

Step 306: Feed back the channel information to the set of the transmission points TP1-TP7, wherein the channel information is related to a plurality of channels between the UE and the set of the transmission points TP1-TP7.

Step 308: End.

According to the process 30, the UE measures the signal quality between the UE and the transmission points TP1-TP7, and determines the set of the transmission points TP1-TP7 if the signal quality is in the one of the plurality of quality regions. Then, the UE feeds back the channel information to the set of the transmission points TP1-TP7, wherein the channel information is related to the plurality of channels between the UE and the set of the transmission points TP1-TP7. In other words, the UE does not feed back entire channel information to the transmission points TP1-TP7, wherein the entire channel information is related to channels between the UE and the transmission points TP1-TP7. But the UE only feeds back the channel information according to the signal quality between the UE and the transmission points TP1-TP7 according to the measurement of the signal quality, to reduce the feedback load and the feedback overhead. Therefore, radio resource on an UL can be saved and congestion and latency in backhaul links between the transmission points TP1-TP7 can be reduced, while performance of the CoMP scheme is fully realized. Besides, the above illustration also solve a problem that a number of UEs in a wireless communication system is usually larger than a number of transmission points and even a number of transmit antennas of the transmission points. Some of the UEs have less chance to be scheduled, and thus these UEs should not feed back the channel information.

Please note that, a spirit of the process 30 is that the UE only feeds back necessary channel information to selected transmission points according to signal quality between the UE and the transmission points TP1-TP7, and detail of realization of the process 30 is not limited. For example, each of the plurality of quality regions is related to a set of the transmission points TP1-TP7. That is, a quality region corresponds to a specific set of the transmission points TP1-TP7. Thus, after the UE measures the signal quality between the UE and the transmission points TP1-TP7 and identifies the quality region in which the signal quality locates, the UE can determine the specific set of the transmission points TP1-TP7. In the following the specific set is termed as the feedback set for clarity. Please note that, even if UEs are closed to each other, the UEs may determine different feedback sets. Besides, the signal quality measured by the UE can be any quality information related to a signal received by the UE, such as signal-to-noise ratio (SNR) or signal-to-noise-plus-interference ratio (SINR) of the signal, and is not limited. Preferably, the signal is a sum of a plurality of signals transmitted by all or part of the transmission points TP1-TP7.

On the other hand, a size of a feedback set of the transmission points TP1-TP7 determined by a UE is preferably related to the signal quality, i.e., related to the quality region in which the signal quality locates. For example, the UE with a better signal quality only needs a feedback set with a small size (i.e. a small number of transmission points) for the CoMP scheme, and the UE with a worse signal quality may need a feedback set with a large size (i.e. a large number of transmission points). In other words, the size of the feedback set increases when the signal quality decreases, and the size of the feedback set decreases when the signal quality increases. Besides, amount of channel information is related to the signal quality. For example, the UE with a better signal quality only needs to feed back less channel information since the size of the feedback set is small, and the UE with a worse signal quality may need to feed back more channel information since the size of the feedback set is large. In other words, an amount of the channel information increases when the signal quality decreases, and the amount of the channel information decreases when the signal quality increases. Preferably, channel information fed back by the UE comprises link qualities (e.g. channel state information (CSI), channel quality indicators (CQIs), or interference measurements defined in the 3GPP standards) of channels between the UE and a feedback set of the transmission points TP1-TP7, such that the feedback set of the transmission points TP1-TP7 can exploit the channel information for performing transmissions and receptions of signals according to the CoMP scheme (e.g. the JP or the CS/CB) efficiently to obtain a better performance after receiving the channel information.

Please note that, a method based on which a plurality of quality regions is generated is not limited, as long as the UE can determine one of the plurality of quality regions according to signal quality measured by the UE, and feed back channel information to a feedback set of the transmission points TP1-TP7 according to the one of the plurality of quality regions. For example, the UE can divide range of the signal quality into the plurality of quality regions by using a plurality of thresholds. Alternatively, the transmission point TP1 (i.e., the serving point for the UE) can divide the range of the signal quality into the plurality of quality regions by using the plurality of thresholds, and transmit a dividing result (e.g. the plurality of quality regions or the plurality of thresholds) to the UE (e.g. via a broadcasting). Preferably, the plurality of quality regions are not overlapped such that the UE can determine the one of the plurality of quality regions according to the signal quality without ambiguity, i.e., avoid a situation that the signal quality locates in two quality regions at the same time.

Figure 4:
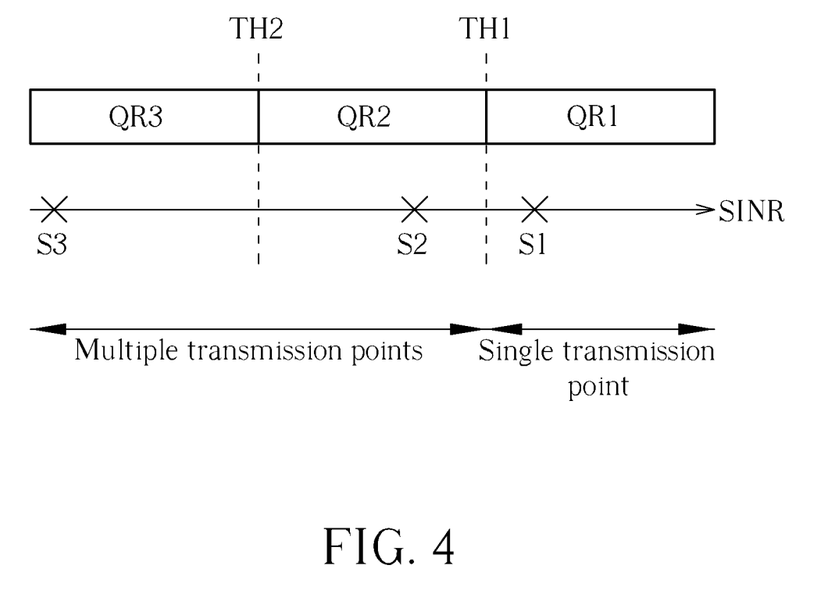
FIG. 4 is a schematic diagram of a partition of range of SINR of a received signal according to an embodiment of the present invention.

Please refer to FIG. 4, which is a schematic diagram of a partition of range of SINR (i.e. signal quality) of a received signal according to an embodiment of the present invention. The range of the SINR is divided (e.g. by the UE or the transmission point TP1 (i.e. the serving point)) into 3 quality regions QR1-QR3 by using thresholds TH1-TH2. Further, the quality region QR1 indicates the transmission point TP1, the quality region QR2 indicates a set of the transmission points TP1-TP7 including the transmission point TP1, and the quality region QR3 indicates the transmission points TP1-TP7 (i.e. all the CoMP cooperating set). That is, FIG. 4 illustrates an example that a quality region is related to one or more transmission points, and the serving point (i.e., the transmission point TP1) is related to each quality region since the signal quality corresponding to the serving point is usually the best among all transmission points. For example, we may further specify that the quality region QR2 corresponds to the transmission points TP1-TP3. If the UE measures the received signal and obtains a SINR value S1, the UE feeds back a link quality (i.e. channel information) between the UE and the transmission point TP1 to the transmission point TP1 since the SINR value S1 locates in the quality region QR1. That is, the SINR of the UE is high enough, and the UE does not need to operate in the CoMP scheme (e.g. if the UE is scheduled). Alternatively, if the UE measures the received signal and obtains a SINR value S2, the UE feeds back link qualities between the UE and the transmission points TP1-TP3 to the transmission points TP1-TP3 directly or via the transmission point TP1, since the SINR value S2 locates in the quality region QR2. That is, the SINR value S2 is not large enough, but not too small. The UE only needs to operate in the CoMP scheme involving part or all of the transmission points TP1-TP3. Similarly, if the UE measures the received signal and obtains a SINR value S3, the UE feeds back link qualities between the UE and the transmission points TP1-TP7 to the transmission points TP1-TP7 directly or via the transmission point TP1, since the SINR value S3 locates in the quality region QR3. That is, the SINR is too small such that the UE needs to be operated in the CoMP scheme involving all the transmission points TP1-TP7. In other words, the smaller the SINR is, the more the transmission points are involved in the CoMP scheme. Oppositely, the larger the SINR is, the less the transmission points are involved in the CoMP scheme. Besides, the quality regions QR1-QR3 can be related to single point transmission, the CS/CB and the JP defined for multi-point transmission (e.g. the CoMP scheme), respectively. That is, the size of the feedback set is different according to different SINR values of the UE. Therefore, feedback load and feedback overhead can be reduced. As a result, radio resource on an UL can be saved and congestion and latency in backhaul links between the transmission points TP1-TP7 can be reduced.

Please note that, a method based on which the UE feeds back link qualities to multiple transmission points is not limited. For example, the UE can directly feed back the link qualities to the multiple transmission points, or feed back the link qualities to a serving point and then the link qualities are exchanged between the serving point and the other transmission points. More specifically, when the UE obtain the SINR S2, the UE can directly feed back the link qualities between the UE and the transmission points TP1-TP3 to part of the transmission points TP2-TP3. Alternatively, the UE can feed back the link qualities between the UE and the transmission points TP1-TP3 to the transmission point TP1. Then, the transmission point TP1 forwards the link qualities to the transmission points TP2-TP3, e.g. via backhaul links between the transmission point TP1 and the transmission points TP2-TP3.

Figure 5:
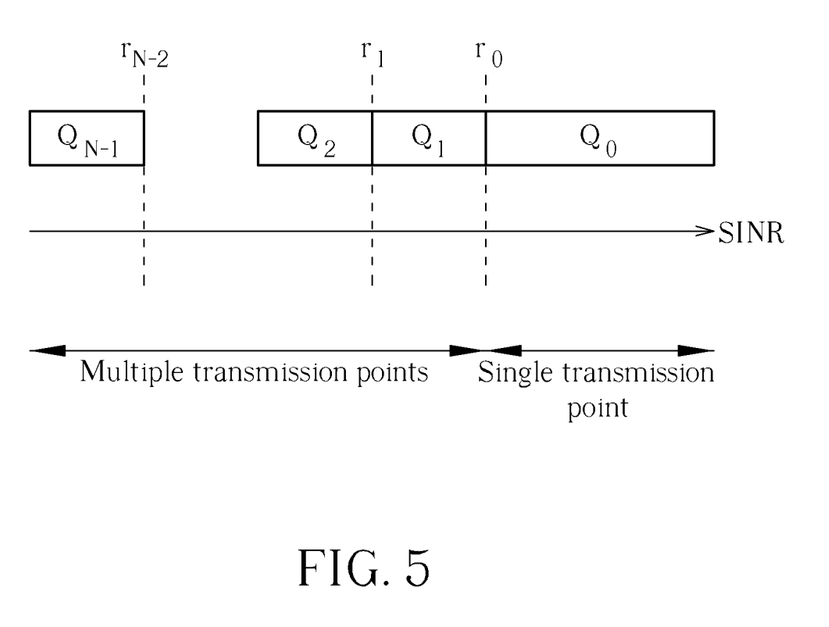
FIG. 5 is a schematic diagram of a partition of range of SINR of a received signal according to an embodiment of the present invention.

Please refer to FIG. 5, which is a schematic diagram of a partition of range of SINR (i.e. signal quality) of a received signal according to an embodiment of the present invention. The range of the SINR is divided (e.g. by the UE and/or the serving point) into N quality regions $Q_0$-$Q_{N-1}$ by using thresholds $r_0$-$r_{N-2}$. In short, a general concept with K UEs and N transmission points is considered in FIG. 5, wherein the N transmission points form a CoMP cooperating set. Without loss of generality, one of the N transmission points is the serving point $TP_1$, and the other transmission points $TP_2$-$TP_N$. The thresholds $r_0$-$r_{N-2}$ are derived based on probability distributions (e.g. probability density functions and/or cumulative distribution functions) of SINRs of received signals transmitted by the CoMP cooperating set. Before relating a quality region to a set of the CoMP cooperating set, the SINRs corresponding to the CoMP cooperating set are first sorted. That is, all the N transmission points (i.e., the CoMP cooperating set) are ranked in terms of the corresponding SINRs. Thus, relation between a quality region to the feedback set can be determined as follows. The quality region $Q_0$ indicates only the serving point, and the quality region $Q_n$ indicates the serving point and n transmission points with the best SINRs among the other N−1 transmission points. That is, the UE always feeds back channel information to the serving point. For example, if a SINR of the received signal measured by a UE locates in the quality region $Q_5$, the feedback information of the UE includes channel information of the serving point and 5 transmission points with the best SINRs among the other N transmission points, i.e., the feedback information of channel information includes 6 transmission points.

In the following, a method for generating the thresholds is illustrated, and the method is not limited herein. In detail, the threshold $r_0$ in FIG. 5 is derived as follows. First, each of the K UEs feeds back a probability distribution of received SINR, i.e., $\{SINR_{1,TP_1}, SINR_{2,TP_1}, \ldots, SINR_{K,TP_1}\}$, to the serving point. The thresholds can be calculated by the UE or the serving point. If the thresholds are calculated by UE, the serving point may broadcast the distribution of signal quality (e.g. SINR or SNR) to the UEs. Therefore, each UE served by the serving point may have different sets of thresholds. If the thresholds are calculated by the serving point, then only one set of thresholds is used for the UEs served by the serving point.

In the following, a method for calculating the thresholds is illustrated. First, we define an order statistics of random variables (i.e. probability distributions) of the received SINR in the serving point with decreasing order as $\{SINR_{(1),TP_1} \geq SINR_{(2),TP_1} \geq \ldots \geq SINR_{(3),TP_1}\}$ Then, the probability that the SINR of a UE k is ranked with an order p among the K UEs can be represented as follows:

$$P\{SINR_{k,TP_1} = SINR_{(p),TP_1} | SINR_{k,TP_1} = sinr_{k,TP_1}\} = \qquad (Eq.\ 1)$$
$$\frac{P\{SINR_{k,TP_1} = SINR_{(p),TP_1}\}}{P\{SINR_{k,TP_1} = sinr_{k,TP_1}\}} = $$
$$\frac{(k-1)![F_{SINR}(sinr_{k,TP_1})]^{k-p}[1-F_{SINR}(sinr_{k,TP_1})]^{p-1}}{(k-p)!(p-1)!}$$

wherein $F_{SINR}(sinr_{k,TP_1})$ is the cumulative distribution function of SINR for the UE k in the serving point $TP_1$, i.e., $SINR_{k,TP_1}$. If the distribution information of signal quality of the UEs in coverage of the serving point $TP_1$ is broadcasted from the serving point $TP_1$, the UE can calculate the equation (Eq.1). The serving point or the UE can obtain the threshold by solving the following equation:

$$P\{SINR_{k,TP_1}=SINR_{(p),TP_1}|SINR_{k,TP_1}=sinr_{k,TP_1}\}=P\{SINR_{k,TP_1}=SINR_{(p+1),TP_1}|SINR_{k,TP_1}=sinr_{k,TP_1}\} \qquad (Eq.2)$$

and $r_0 = sinr_{k,TP_1}$ is obtained.

On the other hand, in order to calculate the thresholds $r_1$-$r_{N-2}$, thresholds $r_{j,1}$-$r_{j,N-2}$ for a UE j are needed to be derived first. First, the UE j or the serving point $TP_1$ calculates SINRs between the UE j and the N transmission points as $\{SINR_{j,TP_1}, SINR_{j,TP_2}, \ldots, SINR_{j,TP_N}\}$. Second, the probability that SINR between the UE j and the transmission point $T_k$ is ranked with an order p among the N transmission points can be represented as follows:

$$P\{SINR_{j,TP_k} = SINR_{j,TP_{(p)}} | SINR_{j,TP_k} = sinr_{j,TP_k}\} = \qquad (Eq.\ 3)$$
$$\sum_P P\left(\begin{array}{c} \underbrace{SINR_{j,TP_{t(1)}} \geq SINR_{j,TP_{t(2)}} \geq \ldots \geq SINR_{j,TP_{t(p-1)}} \geq}_{(p-1)\ variables} \\ SINR_{j,TP_p} \geq \underbrace{SINR_{j,TP_{t(p+1)}} \geq \ldots \geq SINR_{j,TP_{t(K)}}}_{(K-p)\ variables} \end{array}\right)$$

wherein p=1, 2, . . . , N, k=1, 2, . . . , N, and $$\sum_P$$

denotes a summation over all (K−1) permutations (t(1), t(2), . . . , t(p−1), t(p+1), . . . t(K)) of (1, 2, . . . , p−1, p+1, . . . K). Then, the threshold of the UE j can be obtained by solving the following equation:

$$P\{SINR_{j,TP_k}=SINR_{j,TP_{(p)}}|SINR_{j,TP_k}=sinr_{j,TP_k}\}=P\{SINR_{j,TP_k}=SINR_{j,TP_{(p+1)}}|SINR_{j,TP_k}=sinr_{j,TP_k}\}, k=1, 2, \ldots, N \qquad (Eq.4)$$

and $r_{j,p} = sinr_{k,TP_k}$ is obtained. After considering p=1, 2, . . . , N−2, the thresholds $r_{j,1}$-$r_{j,N-2}$ of the UE j can be obtained. If the threshold set is obtained by the UE, the UE can use this threshold set to determine the feedback set for the CoMP scheme. If the thresholds $r_{j,1}$-$r_{j,N-2}$ are obtained by the serving point $TP_1$, the serving point $TP_1$ can simplify the thresholds $r_{j,1}$-$r_{j,N-2}$ by using a single $r_n = \min\{r_{1,n}, r_{2,n}, \ldots r_{K,n}\}$, n=1, 2, . . . N−2. That is, the same set of thresholds $r_n$, n=1, 2, . . . , N−2 are used for the K UEs, and the serving point $TP_1$ can easily broadcast the thresholds to all the K UEs. Therefore, after obtaining the thresholds, the K UEs can determine quality regions by using the thresholds. As a result, feedback load and feedback overhead can be reduced. Radio resource on an UL can be saved and congestion and latency in backhaul links between the transmission points can be reduced.

Please note that, even though SINRs is used as signal quality in abovementioned embodiments, other signal qualities such as SNRs can also used and is not limited. Besides, the abovementioned steps of the processes including suggested steps can be realized by means that could be hardware, a firmware known as a combination of a hardware device and computer instructions and data that reside as read-only software on the hardware device, or an electronic system. Examples of hardware can include analog, digital and mixed circuits known as microcircuit, microchip, or silicon chip.

Examples of the electronic system can include a system on chip (SOC), system in package (SiP), a computer on module (COM), and the communication device 20.

To sum up, the present invention provides a method for generating quality regions such that a UE can feed back necessary channel information to selected transmission points according to one of the quality regions in which signal quality measured by the UE locates. Therefore, radio resource on an UL can be saved and congestion and latency in backhaul links between the transmission points can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of reducing an amount of channel information fed back by a mobile device in a wireless communication system to a plurality of transmission points of the wireless communication system, the method comprising:
    measuring signal quality between the mobile device and the plurality of transmission points;
    determining a set of the plurality of transmission points, if the signal quality is in one of a plurality of quality regions, wherein a size of the set of the plurality of transmission points is related to the signal quality, the size increases when the signal quality decreases, and the size decreases when the signal quality increases; and
    feeding back the channel information to the set of the plurality of transmission points, wherein the channel information is related to a plurality of channels between the mobile device and the set of the plurality of transmission points.

2. The method of claim 1, wherein each of the plurality of quality regions is related to a set of the plurality of transmission points.

3. The method of claim 1, wherein the signal quality comprises signal-to-noise ratio (SNR) or signal-to-noise-plus-interference ratio (SINR) of a signal received by the mobile device, or a channel quality indicator (CQI).

4. The method of claim 1, wherein the signal is a sum of a plurality of signals transmitted by the plurality of transmission points.

5. The method of claim 1, wherein the amount of the channel information is related to the signal quality.

6. The method of claim 5, wherein the amount of the channel information increases when the signal quality decreases, and the amount of the channel information decreases when the signal quality increases.

7. The method of claim 1, wherein the channel information comprises a plurality of link qualities of the plurality of channels.

8. The method of claim 1, wherein range of the signal quality is divided into the plurality of quality regions by using a plurality of thresholds.

9. The method of claim 8, wherein the plurality of thresholds are generated by the mobile device.

10. The method of claim 8, wherein the plurality of thresholds are generated by a serving point of the plurality of transmission points, and the serving point transmits the plurality of thresholds to the mobile device.

11. The method of claim 8, wherein the plurality of thresholds are generated according to a probability distribution of the signal quality.

12. The method of claim 1, wherein the plurality of quality regions are not overlapped.

13. The method of claim 1, wherein the plurality of transmission points comprise a serving point.

14. The method of claim 13, wherein the set of the plurality of transmission points comprises the serving point.

15. The method of claim 14, wherein the mobile device determines only the serving point for feeding back part of the channel information wherein the part of the channel information is related to one of the plurality of channels between the mobile device and the serving point, if the signal quality is in a first quality region of the plurality of quality regions.

16. The method of claim 15, wherein signal quality of the first quality region is better than signal quality of rest of the plurality of quality regions.

17. The method of claim 14, wherein feeding back the channel information to the set of the plurality of transmission points, wherein the channel information is related to the plurality of channels between the mobile device and the set of the plurality of transmission points comprises:
    the mobile device feeding back the channel information to the serving point; and
    the serving point forwarding part of the channel information to rest of the set of the plurality of transmission points, wherein the part of the channel information is related to part of the plurality of channels between the mobile device and the rest of the set of the plurality of transmission points.

* * * * *